United States Patent
Oba et al.

(10) Patent No.: US 7,477,775 B2
(45) Date of Patent: Jan. 13, 2009

(54) MICROSCOPE SYSTEM

(75) Inventors: Masahiro Oba, Tokyo (JP); Tetsuya Koike, Komagane (JP)

(73) Assignee: Olympus Corporation, Tokyo (JP)

( * ) Notice: Subject to any disclaimer, the term of this patent is extended or adjusted under 35 U.S.C. 154(b) by 732 days.

(21) Appl. No.: 10/883,340

(22) Filed: Jul. 1, 2004

(65) Prior Publication Data

US 2005/0013478 A1    Jan. 20, 2005

(30) Foreign Application Priority Data

Jul. 18, 2003    (JP)    ............................. 2003-276457

(51) Int. Cl.
*G06K 9/00* (2006.01)
(52) U.S. Cl. .................................... 382/154
(58) Field of Classification Search ............... D16/131; 345/419–422, 653, 654; 359/346, 368–398; 382/154, 100; 700/757
See application file for complete search history.

(56) References Cited

U.S. PATENT DOCUMENTS

2004/0004614 A1 *  1/2004  Bacus et al. ................ 345/419

2006/0127369 A1 *  6/2006  Christensen et al. ....... 424/93.7

FOREIGN PATENT DOCUMENTS

| JP | 6-94595 A | 4/1994 |
|----|-----------|--------|
| JP | 7-7444    | 1/1995 |

* cited by examiner

*Primary Examiner*—Sherali Ishrat
(74) *Attorney, Agent, or Firm*—Frishauf, Holtz, Goodman & Chick, P.C.

(57) ABSTRACT

A CPU executes a process for building an image, which is projected on three planes such as XY, YZ, and XZ planes mutually intersecting in three-dimensional space, of a three-dimensional image obtained by stacking in a direction of an optical axis a plurality of two-dimensional confocal images, which are obtained by changing the focal position of an objective lens against a sample in the direction of the optical axis of the objective lens. Then, a target region implemented by integrating pixels, whose points projected on the three planes are included in regions respectively specified for the three planes, among pixels configuring each of the two-dimensional confocal image.

18 Claims, 7 Drawing Sheets

MICROSCOPE SYSTEM

CROSS REFERENCE TO RELATED APPLICATION

This application claims benefit of Japanese Application No. 2003-276457, filed Jul. 18, 2003, the contents of which are incorporated by this reference.

BACKGROUND OF THE INVENTION

1. Field of the Invention

The present invention relates to a technique using a sample image obtained by scanning a sample with light via an optical system of a confocal scanning microscope, and by using light reflected from or passing through the sample, and more particularly, to a technique for relating a stereoscopic partial region in the sample to the sample image thus obtained.

2. Description of the Related Art

A confocal scanning microscope scans a sample with a spotlight source, converts only light, which passes through a pinhole among light beams reflected from and passing through the sample, into an electric signal with a photodetector, and obtains three-dimensional information of the sample from this electric signal.

Such a confocal scanning microscope suppresses light scattered from other than a measurement point by illuminating a sample in a pinpoint manner with a combination of a spotlight source of a laser beam, etc. and a pinhole. Additionally, the pinhole as a spatial filter is arranged on the front side of a photodetector, noise light existing on the same plane as the measurement point is image-formed in the periphery of the pinhole, and light coming from a plane shifted from the measurement point in the direction of an optical axis is broadened with an objective lens before the pinhole, whereby light passing through the pinhole is suppressed. As a result, light beams reflected from and passing through other than the measurement point are cut, so that only one point in three-dimensional space can be measured with a photoelectric converter.

In the meantime, it is also known that the confocal scanning microscope has a high resolution in the direction of the optical axis. That is, the intensity of measured light increases when a focus is achieved on the optical axis, but almost becomes zero when the focus is not achieved. Accordingly, a plurality of sample images sliced on a plane vertical to a Z direction can be obtained by moving a focus with predetermined pitches in the Z direction, which becomes the optical axis direction, while performing two-dimensional scanning (plane scanning) the spotlight on the plane of the sample. These sample images represent a stereoscopic (three-dimensional) form of the sample. Accordingly, the stereoscopic image of this sample can be built from these sliced images (two-dimensional confocal images) thus obtained in respective positions of the sample in the Z direction (hereinafter abbreviated to "respective Z positions").

There may be cases where the three-dimensional partial region in the stereoscopic image thus built is targeted, and rescanning or a three-dimensional analysis (a calculation of the volume of the target region, or the like) is performed for the target region. At this time, how to determine and extract the three-dimensional target region becomes significant.

As a general method for determining or extracting a three-dimensional target region, there is a method for determining or extracting a target region for each image sliced in each Z position of a sample, and three-dimensionally concatenating determined or extracted regions. If a determination of a specified region is made for a sliced image according to such a method, a person who makes the determination draws a circle, etc. on a display unit such as a monitor, etc., on which a two-dimensional sliced image is displayed, by operating an input device such as a mouse, etc. of a computer, and the region indicated by the drawing is recognized as a specified region. The determination of a specified region with such drawing is individually made for a sliced image of a sample in each position, and all of target regions to which the determination is made in sliced images in respective Z positions are lastly concatenated, whereby a determination of a three-dimensional target region is made.

Besides, for example, a technique disclosed by Japanese publication of examined patent applications No. HEI 7-7444 exists as a technique extracting a three-dimensional target region.

This technique is characterized in comprising: a two-dimensional image inputting unit partitioning a three-dimensional image representing a three-dimensional object into a plurality of two-dimensional binary images, and inputting the images; a two-dimensional image labeling processing unit extracting a two-dimensional concatenation component for each of the two-dimensional binary images input by the two-dimensional image inputting unit, and executing a labeling process; a two-dimensional image representative point extracting unit extracting a representative point for each labeling region obtained by the two-dimensional image labeling processing unit; a representative point concatenation detecting unit detecting a concatenation of two-dimensional images whose representative points extracted by the two-dimensional image representative point extracting unit are adjacent, and extracting a concatenation component of a representative point; and a three-dimensional image labeling processing unit executing a labeling process for a three-dimensional concatenation component including the concatenation component of the representative point extracted by the representative point concatenation detecting unit.

With its extraction method, a plurality of two-dimensional images are first obtained by slicing a three-dimensional object with the two-dimensional image inputting unit, and a concatenation component of each two-dimensional image is then obtained with the labeling process. After the two-dimensional concatenation component is obtained, the representative point extracting unit obtains a representative point of each two-dimensional concatenation component. After a concatenation of the obtained representative points in two-dimensional images is detected, all of two-dimensional concatenation components including the representative points are extracted as three-dimensional concatenation components. Then, only a three-dimensional concatenation component of a target region is extracted from among the three-dimensional concatenation components thus obtained.

Besides, as a technique associated with the present invention, for example, there is a technique disclosed by Japanese publication of unexamined patent applications No. HEI 6-94595. With this technique, three-dimensional gray-scale image data of particles is obtained by acquiring gray-scale image data of a tomographic image group, the mutual position relationship of which is clear, of the inside of a three-dimensional object to be examined where the particles are distributed, and the three-dimensional binary image data of the particles is obtained by binarizing the gray-scale level of the data of each pixel. Then, binary image data of each particle is eroded to the binary image data of its central point by three-dimensionally executing a erosion process for the binary image data, and the position of each particle is three-dimensionally determined with this binary image data.

SUMMARY OF THE INVENTION

An object of the present invention is to enable a three-dimensional target region for a stereoscopic image of a sample, which is formed by a confocal image, to be specified or determined with less labor. Another object of the present invention is to also enable rescanning and a three-dimensional analysis for the target region to be made with less labor by allowing a three-dimensional target region to be specified or determined with less labor.

A confocal scanning microscope, which is one preferred embodiment of the present invention, comprises a projected image building unit building an image, which is projected on three planes mutually intersecting in three-dimensional space, of a three-dimensional image obtained by stacking in a direction of an optical axis a plurality of two-dimensional confocal images of a sample, which are obtained by changing the focal position of an objective lens against the sample to be observed in the direction of the optical axis of the objective lens; and a target region forming unit forming a target region implemented by integrating pixels, whose projected points on the three planes are included in regions respectively specified for the three planes, among pixels configuring each of the plurality of two-dimensional confocal images.

The above described confocal scanning microscope according to the present invention may be configured to further comprise a region extracting unit extracting regions where the projected images are represented from the respective three planes, and the target region forming unit may be configured to form a target region by using the regions extracted by the region extracting unit as regions respectively specified for the three planes.

Additionally, the above described confocal scanning microscope according to the present invention may be configured to further comprise a specified region display unit displaying an image where the specified region is represented along with the projected image on the respective three planes.

At this time, the image may also be a two-dimensional image including at least any of the three planes where the specified region is represented along with the projected image.

Furthermore, the confocal scanning microscope according to the present invention may be configured to further comprise a target region display unit displaying an image where the target region is represented along with the three-dimensional image.

At this time, the image may be an image where the target region is represented along with the three-dimensional image as a perspective image.

Additionally, at this time, the image may be a two-dimensional image where a cross section obtained when the target region and the three-dimensional image are cut along a predetermined plane is represented.

Furthermore, the above described confocal scanning microscope according to the present invention may be configured to further comprise a scanning unit newly obtaining a three-dimensional image of the sample by scanning the target region.

BRIEF DESCRIPTION OF THE DRAWINGS

The present invention will be more apparent from the following detailed description when the accompanying drawings are referenced.

DESCRIPTION OF THE PREFERRED EMBODIMENTS

Hereinafter, preferred embodiments according to the present invention are described with reference to the drawings. Provided here are examples where information about the shape of a sample is obtained by two-dimensionally scanning the sample with a control of an optical system of a confocal scanning optical microscope. [Implementation Example 1] refers to an example where a three-dimensional target region is determined, whereas [Implementation Example 2] refers to an example where a three-dimensional target region is extracted.

IMPLEMENTATION EXAMPLE 1

Figure 1:
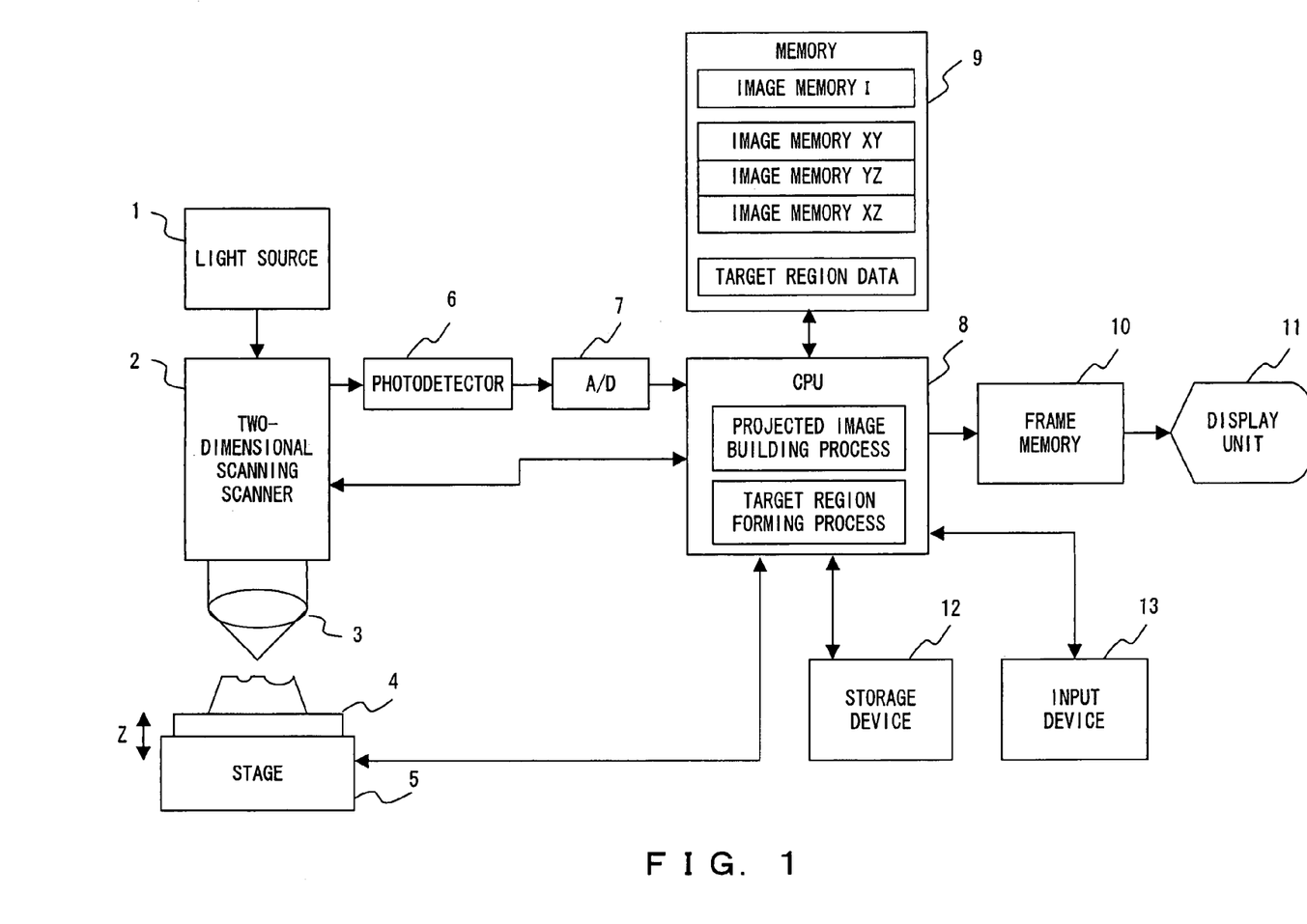
FIG. 1 shows a first example of a configuration of a confocal scanning microscope system implementing the present invention.

FIG. 1 is first described. This figure shows a first example of a configuration of a confocal scanning microscope system implementing the present invention.

In FIG. 1, a light source 1 is a spotlight source of a laser beam, etc. Spotlight emitted from the light source 1 is guided to a two-dimensional scanning scanner 2.

The two-dimensional scanning scanner 2 is intended to two-dimensionally scan the spotlight emitted from the light source 1 in the sample 4 in a direction vertical to the optical axis of the spotlight. The two-dimensional scanning scanner 2 comprises, for example, an X scanner which is a galvanometer mirror or a resonant scanner for scanning in an X direction, and a Y scanner which is a galvanometer mirror for scanning in a Y direction perpendicular to the X direction. The two-dimensional scanning scanner 2 scans the spotlight in the sample 4 in the X and the Y directions by respectively actuating the X and the Y scanners in two directions such as the X and the Y directions.

The spotlight two-dimensionally scanned by the two-dimensional scanning scanner 2 is illuminated on the sample 4 on a stage 5 after passing through an objective lens 3. The stage 5 is movable in a Z axis direction (orthogonal to both the X and the Y directions), and can move the sample 4 in the direction of the optical axis of the spotlight.

Light reflected from or passing through the sample 4 on which the spotlight is illuminated is returned to the two-dimensional scanning scanner 2 via the objective lens 3, and then guided to a photodetector 6. On the front side of the reception plane of the photodetector 6, a pinhole not shown is provided. The photodetector 6 receives the light that passes through the pinhole, and converts the received light into an electric signal according to the intensity of the light.

To the photodetector 6, a CPU (Central Processing Unit) 8 is connected via an A/D converter 7. The CPU 8 is directly connected not only to the two-dimensional scanning scanner 2, but also to the stage 5, a memory 9, and a frame memory 10. To the frame memory 10, a display unit 11 is connected.

The CPU 8 is intended to control the entire operations of the system shown in FIG. 1 by executing a predetermined control program. For example, the CPU 8 controls the scanning of the spotlight for the two-dimensional scanning scanner 2, and the move of the stage 5 in the direction of the Z axis, and executes a process for generating a three-dimensional stereoscopic image based on the detected value of the intensity of light from the sample 4, which is detected by the photodetector 6, or for generating an image (projection image) obtained when the generated stereoscopic image is projected on the respective reference planes such as an XY plane, an XZ plane, and a YZ plane.

The CPU 8 is also connected to the input device 13. The CPU 8 also executes processes such as a process for drawing a region determined, specified or identified by a user on the display unit 11, or for forming a target region in a two-dimensional confocal image according to an operation from the input device 13 operated by the user of the system shown in FIG. 1. The input device 13 comprises a mouse, a keyboard, etc.

The memory 9 stores and holds image data of a confocal image generated based on the detection value of the intensity of light on the sample 4, which is detected by the photodetector 6, image data representing the three-dimensional stereoscopic image (sample image) of the sample 4, which is generated by the CPU 8 based on the image data of the confocal image, image data representing an image, which is projected on the respective planes such as the XY plane, the XZ plane, and the YZ plane, of the stereoscopic image, data for identifying a target region, and the like.

The display unit 11 reads the image data representing the three-dimensional stereoscopic image of the sample 4, or the image data representing the image projected on the respective planes such as the XY plane, the XZ plane, and the YZ plane, the image data being generated by the CPU 8 and stored in the frame memory 10, and displays the stereoscopic image or the projected image.

Here, as the CPU 8, the memory 9, the frame memory 10, the display unit 11, the storage device 12, and the input device 13, a computer system having a standard configuration, namely, a computer comprising a CPU which controls the operations of the computer system by executing a control program, a main memory which the CPU uses as a working memory on demand, a display device which displays various types of images or information, a storage device such as a hard disk device, etc., in which various types of programs, control data, etc. are stored, an input device which is configured by a keyboard, a mouse, etc. operated by a user, obtains an instruction from the user that corresponds to the operation, and conveys the instruction to the CPU, and an interface unit which obtains the digital data output from the A/D 7, and manages the transmission of a control signal controlling the operations of the two-dimensional scanning scanner 2 and the stage 5.

The control process executed by the CPU 8 of the confocal scanning microscope system shown in FIG. 1 is described next with reference to FIG. 2. The process represented by the flowchart shown in FIG. 2 is implemented in a way such that the CPU 8 reads and executes a predetermined control program stored in the storage device 12, and the process is started when an instruction to start execution, which is made by a user of this system to the input device 13, is detected by the CPU 8.

Figure 2:
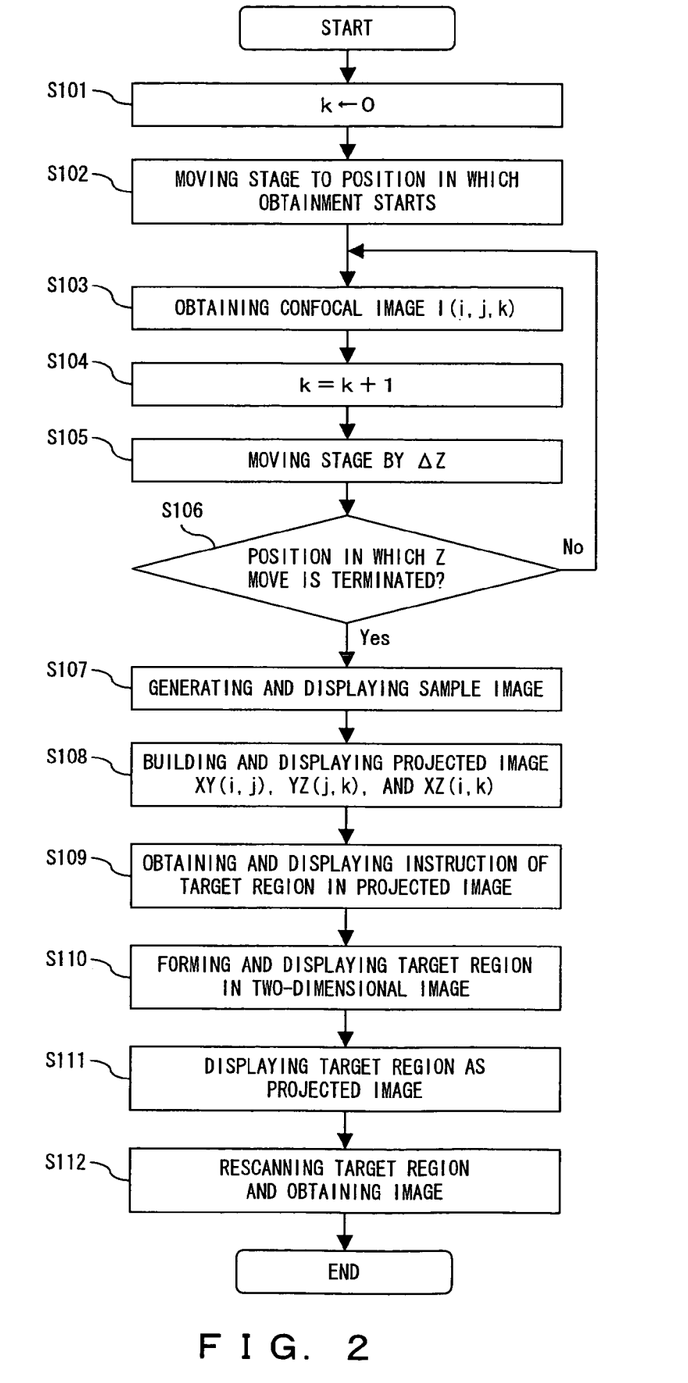
FIG. 2 is a flowchart showing the contents of a control process executed by a CPU shown in FIG. 1.

Variables used in FIG. 2 are described. i, j, and k respectively indicate the X coordinate (i=1, 2, 3, . . . , Ni) of a pixel, the Y coordinate (j=1, 2, 3, . . . Nj) of the pixel, and a measurement position (k=0, 1, 2, 3, . . . , Nk) of a confocal image in the Z direction. I(i,j,k) indicates the confocal image data of the pixel in the position identified with i, j, and k.

Firstly, in S101, a process for assigning an initial value 0 to the variable k is executed.

Then, in S102, a process for moving the position of the sample 4 in the Z direction to a position in which the obtainment of a two-dimensional confocal image is started by controlling the operation of the stage 5 is executed.

Next, in S103, a process for obtaining the confocal image data I(i, j, k) in the position of the sample 4 in the Z direction at this time, and for storing the data in a predetermined storage area of the memory 9 is executed. In the process executed in S103, the image data of the two-dimensional confocal image on the entire one screen in the position of the sample 4 in the Z direction at this time is obtained by updating the values of i and j in order.

Then, in S104, a process for again assigning to the variable k a result obtained by adding 1 to the current value of the variable k is executed.

In S105, a process for moving the position of the sample 4 in the Z direction by $\Delta Z$ by controlling the operation of the stage 5 is executed. $\Delta Z$ is a value indicating the measurement interval of a two-dimensional confocal image. Here, this value is assumed to be preset.

In S106, a process for determining whether or not the position of the sample 4 in the Z direction after being moved with the process in the preceding step goes beyond a position in which the obtainment of the image is terminated is executed. If the position of the sample 4 is determined to go beyond the position of the obtainment termination (the result of the determination made in step S106 is "Yes"), the flow goes to S 107. If the position of the sample 4 is determined not to go beyond the position of the obtainment of the termination (the result of the determination made in step S106 is "No"), the flow goes back to S103, and the above described processes are repeated.

In S107, a process for generating image data representing the three-dimensional stereoscopic image (sample image) of the sample 4 based on the image data of two-dimensional confocal images (the two-dimensional confocal image is also referred to simply as a "two-dimensional image" of the sample 4 in the following description) in respective positions of the sample 4 in the Z direction, which are obtained by repeating the above described processes up to S103, and for displaying the sample image on the display unit 11 is executed. The stereoscopic image of the sample image is an image where the confocal images in the respective positions of the sample 4 in the Z direction are stacked in the Z direction. In this preferred embodiment, the display unit 11 is made to display the sample image of the sample 4 as a perspective view which is shown in FIG. 3 and viewed obliquely upward.

Figure 3:
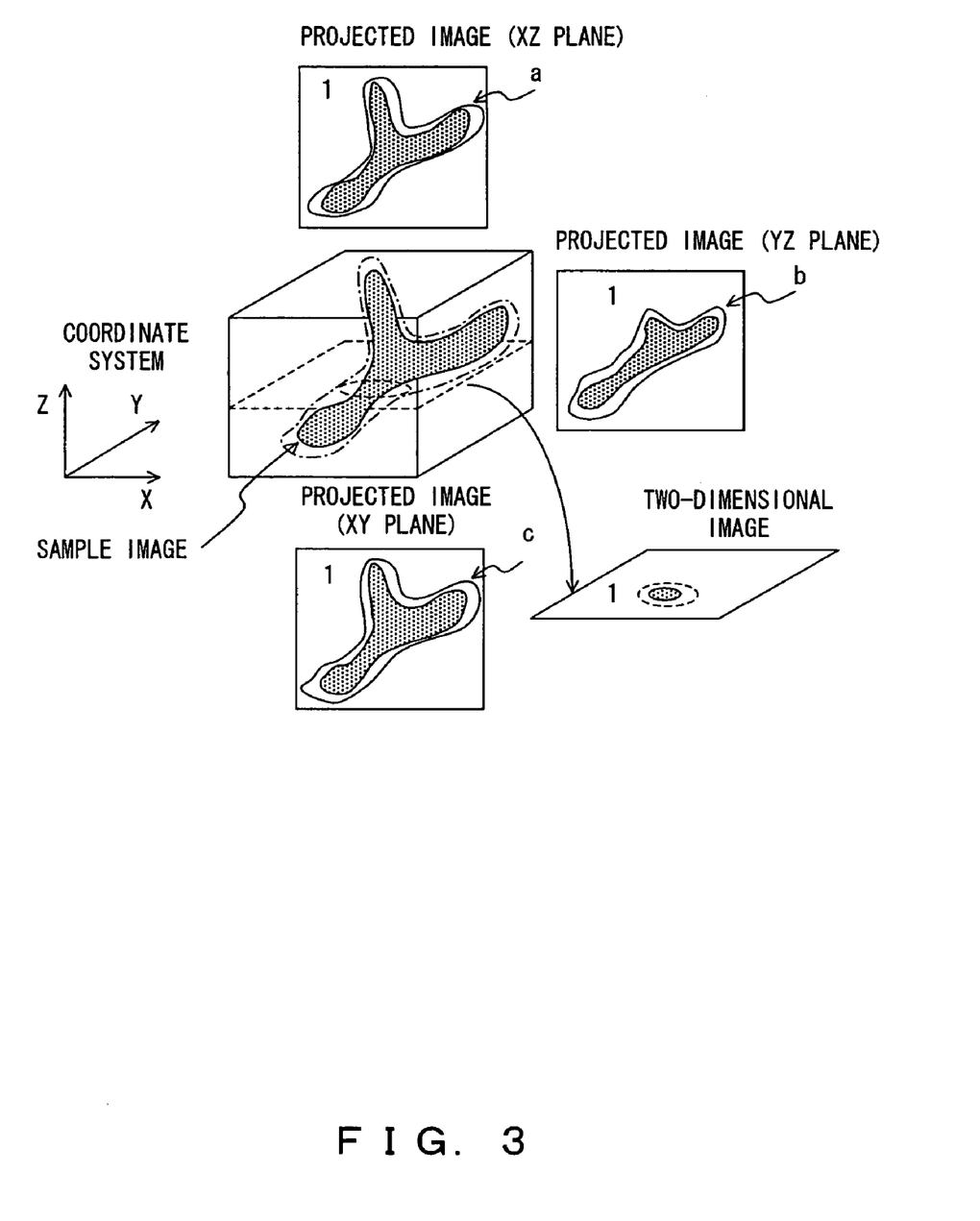
FIG. 3 explains a method for specifying target region.

In S108, a process for building a projected image, namely, a process for building the image data representing an image, which is projected on the respective reference planes such as the XY plane, the XZ plane, and the YZ plane, of the sample image generated with the process in the preceding step is executed, and a process for making the display unit 11 display these projected images in order to enable the understanding of an association with the sample image, for example, as shown in FIG. 3 is executed. These three planes such as the XY plane, the XZ plane, and the YZ plane are mutually orthogonal in the three-dimensional space as a matter of course.

Next, in S109, a process for drawing and displaying a line for specifying a target region for the above described respective reference planes displayed on the display unit 11 according to an operation performed for the input device 13 such as a mouse, etc. is executed.

In the example shown in FIG. 3, closed curves indicated with symbols a, b, and c are drawn in the respective projected images, and specification for forming a targeted region is made with each of these closed curves.

For the region thus specified, a process for assigning the same number is executed to clarify an association among the reference planes. The example shown in FIG. 3 indicates that a number "1" is assigned to the closed curves a, b, and c.

After the obtainment of the specification of a region is terminated in this way, a process for forming a target region, namely, a process for forming and displaying a target region in a two-dimensional image based on the number assigned to the projected image of the respective reference planes is executed in S110. Specifically, this process is executed as follows.

Firstly, a process for determining whether or not the position of each pixel when being projected on the respective reference planes such as the XY plane, the XZ plane, and the YZ plane is included in regions, which are specified on the reference planes and to which the same number is assigned, on all of the reference planes for each pixel configuring a two-dimensional image, for assigning the same number as that assigned to the specified regions only to a pixel which satisfies this determination condition, and for displaying an image is executed. The image displayed here is the two-dimensional image shown in FIG. 3, namely, the image where the cross section obtained when the target region (indicated by the broken line) and the three-dimensional image (indicated by being shaded) are cut along a predetermined plane is represented. After this process is executed for all of pixels configuring the two-dimensional image, and for all of pieces of the two-dimensional image data in the respective Z positions stored in the memory 9, a process for forming a region by integrating pixels to which the same number is assigned is executed. As a result, the specification of a region made on the reference planes becomes a specification or determination of a three-dimensional target region.

The processes described up to this point are executed by the CPU 8 shown in FIG. 1, whereby the specification or determination of a three-dimensional target region to the system shown in FIG. 1 is enabled only with the specification of a region, which is made by a user of the system, for the 3 respective reference planes such as the XY plane, the XZ plane, and the YZ plane, and the amount of operations of the user, which is required to make the specification or determination of a three-dimensional target region, is significantly reduced.

Thereafter, in step S111, a process for generating image data representing the target region formed by integrating the pixels with the process in the preceding step as a three-dimensional stereoscopic image, for stacking the stereoscopic image in the target region on the stereoscopic image of the sample 4, and for making the display unit 11 display the stacked image is executed. In this preferred embodiment, the display unit 11 is made to display the sample image in the target region (the image represented by a one-dot chain line in FIG. 3) as a perspective image viewed obliquely upward, similar to the sample 4 shown in FIG. 3.

Then, in step S112, a process for controlling the two-dimensional scanning scanner 2 and the stage 5, for two-dimensionally rescanning the spotlight in the target region thus formed, and for again obtaining the confocal image (for example, an image of a higher magnification) of the sample 4 in the target region is executed.

Note that a three-dimensional analysis process for a volume, etc. may be executed for the target region instead of the process in S112.

As described above, the amount of operations required when a user of the system rescans a target region or make a three-dimensional analysis for the target region is significantly reduced according to Implementation Example 1.

IMPLEMENTATION EXAMPLE 2

Figure 4:
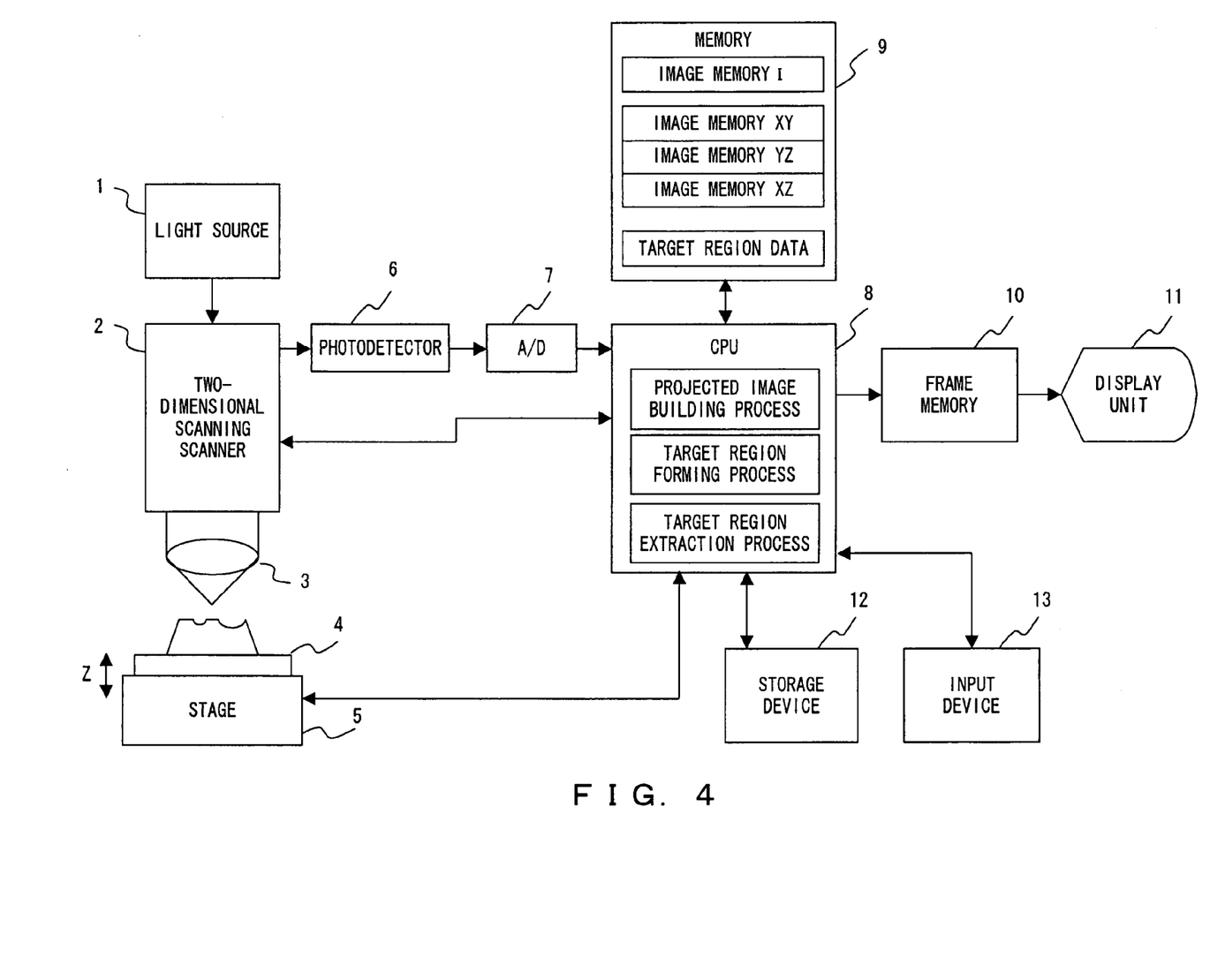
FIG. 4 shows a second example of a configuration of the confocal scanning microscope system implementing the present invention.

FIG. 4 is described. This figure shows a second example of the configuration of the confocal scanning microscope system implementing the present invention. The configuration of the second example is fundamentally similar to that of the first example shown in FIG. 1, and a difference exists only in a point that a process for extracting a target region is further executed by the CPU 8 in the second example.

A control process executed by the CPU 8 of the confocal scanning microscope system shown in FIG. 4 is described with reference to FIG. 5. This process represented by the flowchart in FIG. 5 is implemented in a way such that the CPU 8 reads and executes a predetermined control program stored in the storage device 12, and the process is started when an instruction to start execution, which is made by a user of this system to the input device 13, is detected by the CPU 8.

Figure 5:
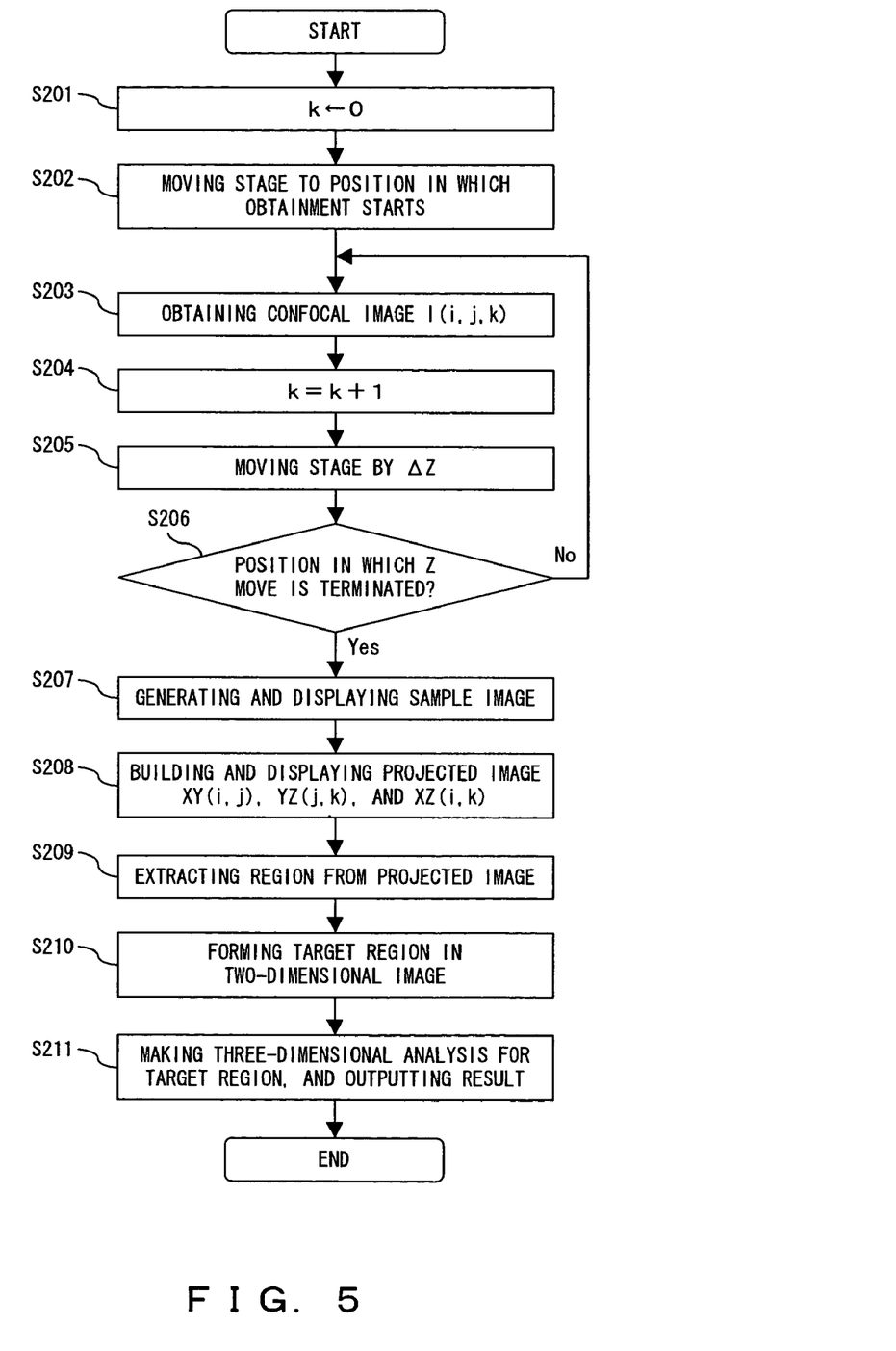
FIG. 5 is a flowchart showing the contents of a control process executed by a CPU shown in FIG. 4.

Variables used in FIG. 5 are similar to those used in the flowchart shown in FIG. 2. i, j, and k respectively indicate the X coordinate (i=1, 2, 3, . . . , Ni) of a pixel, the Y coordinate (j=1, 2, 3, . . . , Nj) of the pixel, and a measurement position (k=0, 1, 2, 3, . . . , Nk) of a confocal image in the Z direction. I(i, j, k) indicates the confocal image data of the pixel in the position identified with i, j, and k.

In FIG. 5, processes in S201 to S208 are similar to those in S101 to S108 of FIG. 2.

In S209, the process for extracting a target region, namely, the process for extracting a region, which is an image built with the process for building a projected image in S208 and projected on the respective reference planes such as the XY plane, the XZ plane, and the YZ plane, of the sample image, is executed. In this implementation example, a binary image obtained by binarizing the image, which is projected on the respective reference planes such as the XY plane, the XZ plane, and the YZ plane, of the sample image based on its intensity, and for extracting a region having one value of the binary image is executed. Here, as a threshold value for generating a binary image, which is used to determine whether the intensity of each pixel is either higher or lower, a value that a user of the system shown in FIG. 4 specifies via the input device 13 before the execution of the process shown in FIG. 5 is started may be used. Or, a user of the system shown in FIG. 4 may be made to input the specification of the value to the input device 13 when the process in S209 is executed.

Figure 6:
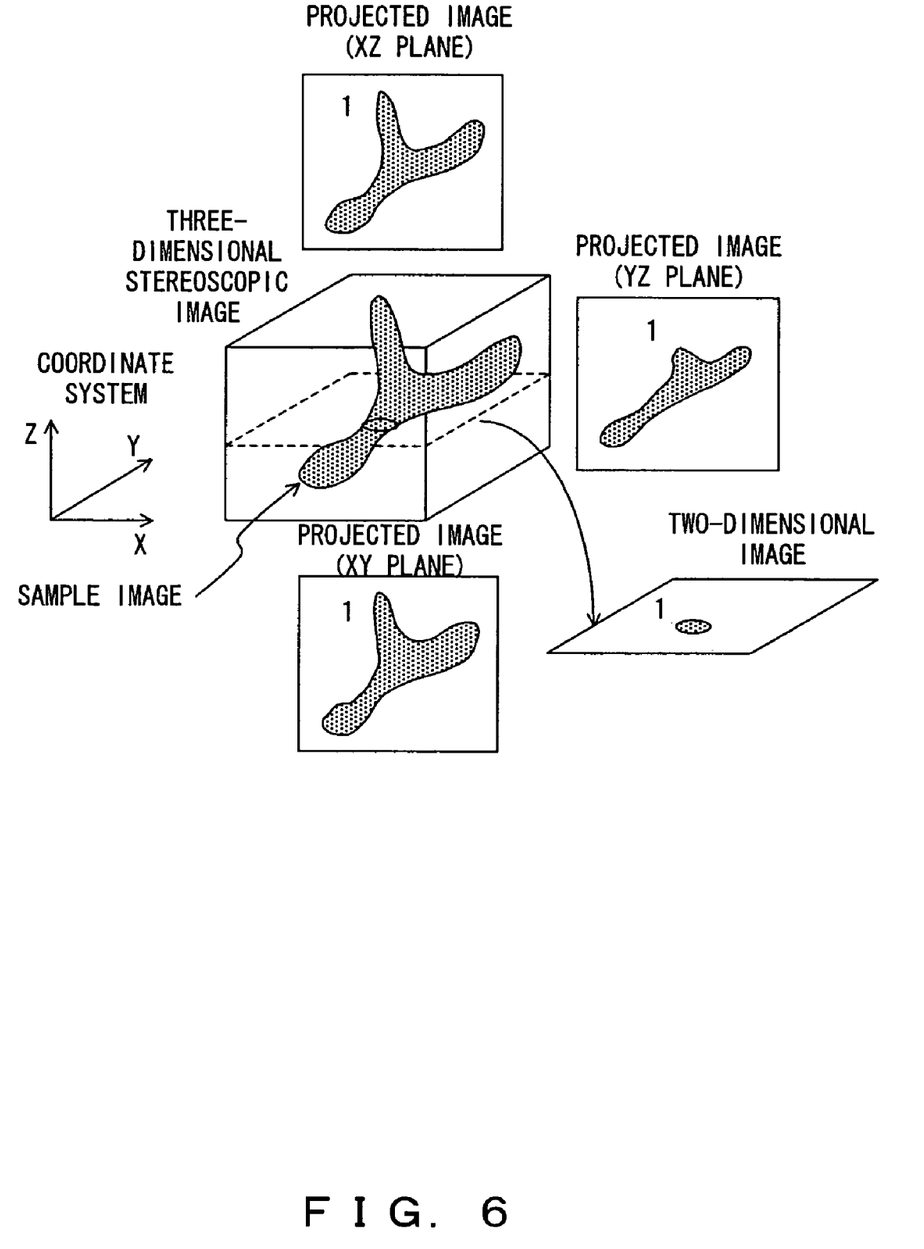
FIG. 6 explains a method extracting a target region.

For the region thus extracted, a process for assigning the same number is executed to clarify an association among the reference planes. The extraction example of the region shown in FIG. 6 indicates that a common number "1" is assigned to images, which are projected on the respective reference planes such as the XY plane, the XZ plane, and the YZ plane, of the sample image.

When the extraction of a region is terminated in this way, a process for forming a target region, namely, a process for forming a target region in a two-dimensional image based on an extraction region of the projected images, which are binary images represented on the respective reference planes, is executed. This process is similar to that of S110 shown in FIG. 2.

Firstly, a process for determining whether or not the position of each pixel when being projected on the respective reference planes such as the XY plane, the XZ plane, and the YZ plane is included in regions on the reference planes, which are extracted and to which the same number is assigned, on all of the reference planes for each pixel configuring the two-dimensional image, and for assigning the same number as that assigned to the extraction regions only to a pixel which satisfies this determination condition is executed. This process is executed for all of pixels configuring the two-dimensional image, and for all pieces of two-dimensional image data in respective Z positions stored in the memory 9. Consequently, the result of the extraction of a region on the reference planes, which is made with the process in S209, becomes an extraction result of a three-dimensional target region.

The processes described up to this point are executed by the CPU 8 shown in FIG. 1, whereby a three-dimensionally arranged sample image can be extracted as a target region, and a target region is formed in each two-dimensional confocal image without observer's performing even an operation for specifying a region for each of the three planes.

Thereafter, in S211, a process for making a three-dimensional analysis for the target region thus formed, and for outputting its result is executed. As the three-dimensional analysis process executed here is, for example, a calculation of the volume or the surface area of the target region (namely, the sample 4), measurements of a size, an angle, or a position of the target region, a calculation of moment of internal of the target region, a calculation of a circumscribed graphic or a graphic corresponding to an elliptic form, a calculation of an average value, a maximum value, or a minimum value of the intensity of pixels within the target region, or a calculation of a density of the pixels, or the like.

As a matter of course, the process in S112 shown in FIG. 2, namely, the process for again obtaining confocal image data by performing rescanning for a target region can be executed instead of the process in S211.

Additionally, if only some of regions of the sample image are desired to be extracted, a process for creating a binary image of only a region determined, identified or specified by an operation performed using the input device 13 such as a mouse, etc. may be executed in the process for creating a binary image, which is a projected image. Or, after the process for creating a binary image of a projected image is completed, a process for deleting other than a region determined, identified or specified by an operation performed using the input device 13 such as a mouse, etc. may be executed.

In the above described implementation examples, the measurement position of a confocal image is indicated as relative information. However, absolute information of a Z position, or relative information obtained based on absolute information may be used to indicate the measurement position.

Additionally, in the implementation examples, the stage 5 is moved as a relative move in the Z direction. However, the objective lens 3 may be moved.

In the meantime, the present invention can be also implemented in a way such that a control program for causing the CPU of the above described standard computer to execute the processes represented by the flowcharts shown in FIGS. 2 and 5 is created and recorded onto a computer-readable storage medium, and the program is read from the storage medium into the computer and executed by the CPU.

Figure 7:
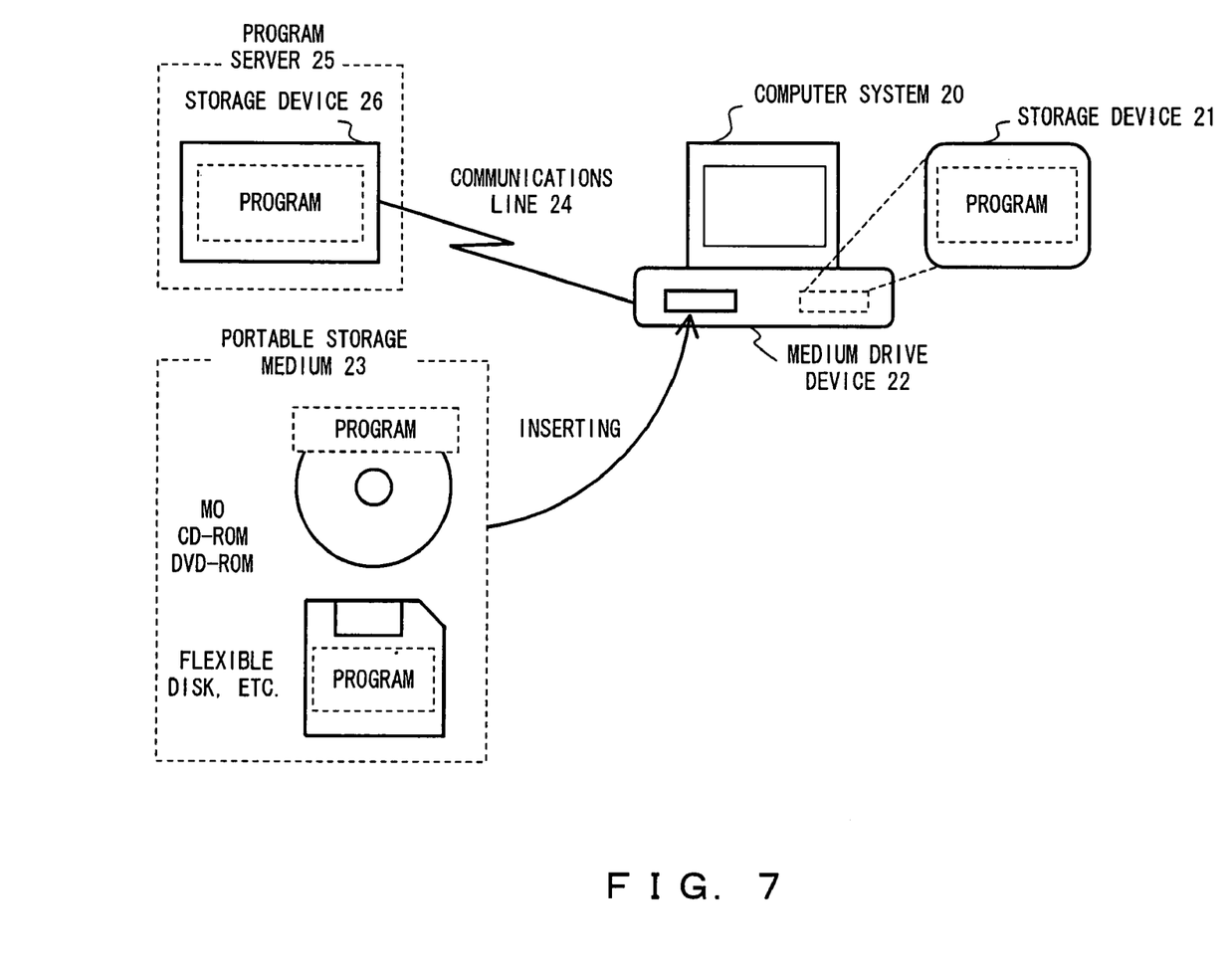
FIG. 7 shows an example of a storage medium from which a recorded control program can be read by a computer.

Examples of the storage medium from which the recorded control program can be read by a computer system are shown in FIG. 7. As such a storage medium, for example, a storage device 21 such as a ROM, a hard disk device, etc., which is included in a computer system 20 or comprised as an externally attached device, a portable storage medium 23 such as a flexible disk, an MO (Magneto-Optical) disk, a CD-ROM, a DVD-ROM, etc., from which a recorded control program can be read by being inserted into a medium driving device 22 comprised by the computer system 20, or the like is available.

Additionally, the storage medium may be a storage device 26, which is connected to the computer system 20 via a communications line 24 and comprised by a computer system functioning as a program server 25. In this case, a transmission signal obtained by modulating a carrier wave with a data signal representing a control program is transmitted from the program server 25 to the computer system 20 via the communications line 24, which is a transmission medium, and the control program is regenerated by demodulating the received transmission signal in the computer system 20, whereby this control program can be executed by the CPU of the computer system 20.

Additionally, the present invention is not limited to the above described preferred embodiments. Various modifications and improvements can be made within a scope that does not deviate from the gist of the present invention.

What is claimed is:

1. A confocal scanning microscope, comprising:
a projected image building unit which builds projected two-dimensional images on respective planes mutually intersecting in three-dimensional space from a three-dimensional image projected on the mutually intersecting planes, the projected three-dimensional image being obtained by stacking a plurality of two-dimensional confocal images of a sample in a direction of an optical axis of an objective lens, the plurality of two-dimensional confocal images being obtained by changing a focal position of the objective lens against the sample in the direction of the optical axis of the objective lens;
a specified region obtaining unit which obtains two-dimensional regions specified for the projected two-dimensional images on each of the three planes, and which represents the specified two-dimensional regions on the respective projected two-dimensional images;
a target region forming unit which forms a three-dimensional target region from the specified two-dimensional regions of the projected two-dimensional images on the three planes; and
a target region display unit which displays an image where the three-dimensional target region is represented along with the projected three-dimensional image.

2. The confocal scanning microscope according to claim 1, further comprising a region extracting unit which extracts regions where the projected two-dimensional images are represented from the respective three planes, wherein said target region forming unit forms the three-dimensional target region by recognizing the regions extracted by said region extracting unit as the regions respectively specified for the three planes.

3. The confocal scanning microscope according to claim 1, further comprising a specified region displaying unit displaying an image where the specified two-dimensional regions are represented on the three planes along with the projected image.

4. The confocal scanning microscope according to claim 3, wherein the image displayed by the specified region displaying unit is a two-dimensional image including at least one of the three planes where the specified two-dimensional regions are represented along with the projected image.

5. The confocal scanning microscope according to claim 1, wherein the three-dimensional target region is represented along with the three-dimensional image as a perspective image viewed obliquely upward.

6. The confocal scanning microscope according to claim 1, wherein the image displayed by the target region display unit is a two-dimensional image where a cross section obtained when the three-dimensional target region and the three-dimensional image are cut along a predetermined plane.

7. The confocal scanning microscope according to claim 1, further comprising a scanning unit which scans the three-dimensional target region, and newly obtains a three-dimensional image of the sample.

8. A confocal scanning microscope, comprising:
projected image building means for building projected two-dimensional images on respective planes mutually intersecting in three-dimensional space from a three-dimensional image projected on the mutually intersecting planes, the projected three-dimensional image being obtained by stacking a plurality of two-dimensional confocal images of a sample in a direction of an optical axis of an objective lens, the two-dimensional confocal images of the sample being obtained by changing a focal position of the objective lens against the sample to be observed in the direction of the optical axis of the objective lens;
specified region obtaining means for obtaining two-dimensional regions specified for the projected two-dimensional images on each of the three planes and representing the specified two-dimensional regions on the respective projected images;
target region forming means for forming a three-dimensional target region from the specified two-dimensional regions of the projected two-dimensional images on the three planes; and
target region display means for displaying an image where the three-dimensional target region is represented along with the projected three-dimensional image.

9. A method specifying a target region, comprising:
building projected two-dimensional images on respective planes mutually intersecting in three-dimensional space from a three-dimensional image projected on the mutually intersecting planes, the projected three-dimensional image being obtained by stacking a plurality of two-dimensional confocal images of a sample in a direction of an optical axis of an objective lens of a confocal scanning microscope, the plurality of two-dimensional confocal images being obtained by changing a focal position of the objective lens of the confocal scanning microscope against the sample in the direction of the optical axis of the objective lens;
obtaining two-dimensional regions of specified for the projected two-dimensional images on each of the three planes, and representing the specified two-dimensional regions on the respective projected two-dimensional images;
forming a three-dimensional target region from the specified two-dimensional regions of the projected two-dimensional images on each of the three planes; and
displaying an image where the three-dimensional target region is represented along with the projected three-dimensional image.

10. The method according to claim 9, further comprising extracting regions where the projected two-dimensional images are represented from the respective three planes, wherein the three-dimensional target region is formed by recognizing the extracted regions as the regions respectively specified for the three planes when forming the three-dimensional target region.

11. A computer readable storage medium having stored thereon on a computer program for controlling a computer to execute functions comprising:
building projected two-dimensional images on respective planes mutually intersecting in three-dimensional space from a three-dimensional image projected on the mutually intersecting planes, the projected three-dimensional image being obtained by stacking a plurality of two-dimensional confocal images of a sample in a direction of an optical axis of an objective lens of a confocal scanning microscope, the plurality of two-dimensional confocal images being obtained by changing a focal position of the objective lens against the sample in the direction of the optical axis of the objective lens;
obtaining two-dimensional regions specified for the projected two-dimensional images on the three planes, and representing the specified two-dimensional regions on the respective projected two-dimensional images;
forming a three-dimensional target region from the specified two-dimensional regions of the projected two-dimensional images on the three planes; and
displaying an image where the three-dimensional target region is represented along with the projected three-dimensional image.

12. The computer readable storage medium according to claim 11, wherein the program controls the computer to execute a further function of extracting regions where the projected two-dimensional images are represented from the respective three planes, wherein the three-dimensional target region is formed by recognizing the extracted regions as the regions respectively specified for the three planes.

13. The computer readable storage medium according to claim 11, wherein the program controls the computer to execute a further function of performing a three-dimensional analysis of the three-dimensional target region.

14. The confocal scanning microscope according to claim 1, wherein the target region forming unit forms the three-dimensional target region from the specified two-dimensional regions on the three planes by integrating pixels, whose position of points projected on respective planes when the pixels are projected on each of the three planes are, at any of the three planes, included in the specified two-dimensional regions, among the pixels configuring the two-dimensional confocal images.

15. The confocal scanning microscope according to claim 14, wherein the specified region obtaining unit obtains a plurality of the specified two-dimensional regions for each of the projected two-dimensional images and assigns an identification code for identifying the specified two-dimensional regions when combined with the projected two-dimensional images for each of the projected two-dimensional images, and
wherein the target region forming unit forms, for each identification code, a plurality of the target regions including the integrating pixels whose projected points are included in the specified two-dimensional regions belonging to a same combination identified by the identification code.

16. The confocal scanning microscope according to claim 8, wherein the target region forming means forms the three-dimensional target region from the specified two-dimensional regions on the three planes by integrating pixels, whose position of points projected on respective planes when the pixels are projected on each of the three planes are, at any of the three planes, included in the specified two-dimensional regions, among the pixels configuring the two-dimensional confocal images.

17. The method according to claim 9, wherein the three-dimensional target region is formed from the specified two-dimensional regions on each of the three planes by integrating pixels, whose position of points projected on respective planes when the pixels are projected on each of the three planes are, at any of the three planes, included in the specified two-dimensional regions, among the pixels configuring the two-dimensional confocal images.

18. The computer readable storage medium according to claim 11, wherein the three-dimensional target region is formed from the specified two-dimensional regions on each of the three planes by integrating pixels, whose position of points projected on respective planes when the pixels are projected on each of the three planes are, at any of the three planes, included in the specified two-dimensional regions, among the pixels configuring the two-dimensional confocal images.

* * * * *

UNITED STATES PATENT AND TRADEMARK OFFICE
CERTIFICATE OF CORRECTION

PATENT NO. : 7,477,775 B2  Page 1 of 1
APPLICATION NO. : 10/883,340
DATED : January 13, 2009
INVENTOR(S) : Masahiro Oba It is certified that error appears in the above-identified patent and that said Letters Patent is hereby corrected as shown below:

Column 10, Line 50, (Claim 3, Line 2);

Change "displaying" to --which displays--.

Column 11, line 43, (Claim 9, line 14);

Delete "of".

Signed and Sealed this

Twenty-first Day of April, 2009

JOHN DOLL
*Acting Director of the United States Patent and Trademark Office*